United States Patent [19]
Yoshino et al.

[11] 3,975,750
[45] Aug. 17, 1976

[54] VIEW FINDER FOR A SINGLE LENS REFLEX CAMERA

[75] Inventors: Zenzaburo Yoshino, Tokyo; Yoshikazu Ando, Musashino; Junichi Yokozato, Kawagoe, all of Japan

[73] Assignee: Zenza Bronica Industries, Inc., Tokyo, Japan

[22] Filed: Aug. 16, 1974

[21] Appl. No.: 498,122

[30] Foreign Application Priority Data

| Aug. 16, 1973 | Japan | 48-92004 |
| Feb. 21, 1974 | Japan | 49-20687 |
| Mar. 5, 1974 | Japan | 49-25457 |
| Mar. 5, 1974 | Japan | 49-25851 |

[52] U.S. Cl. ............... 354/225; 354/15.5; 354/187
[51] Int. Cl.² ............... G03B 13/16; G03B 19/12
[58] Field of Search ........... 354/219, 224, 225, 154, 354/155, 187, 190, 192–194, 220, 221, 222, 223, 150, 166; 352/206

[56] References Cited
UNITED STATES PATENTS

| 1,631,303 | 6/1927 | Washington | 354/155 |
| 2,168,977 | 8/1939 | Crumrine | 354/224 X |
| 2,521,790 | 9/1950 | Haeseler | 354/155 |
| 2,811,075 | 10/1957 | Chevallaz | 354/219 X |
| 2,914,997 | 12/1959 | Grey | 354/155 |
| 3,218,948 | 11/1965 | Hüppenbender | 354/224 |
| 3,613,543 | 10/1971 | Mita et al. | 354/224 |
| 3,783,760 | 1/1974 | Allen et al. | 354/225 X |
| 3,821,768 | 6/1974 | Urano et al. | 354/219 |

*Primary Examiner*—Joseph F. Peters, Jr.
*Assistant Examiner*—E. M. O'Connor

[57] ABSTRACT

A first focusing optical system including a mirror is located behind the taking lens of a single lens reflex camera for reflecting the light coming through the taking lens at an angle with respect to the optical axis thereof and forming an inverted real image of an object to be photographed on the first focal plane in reduced scale. A second focusing optical system is provided behind the first focal plane to form an erected real image of the object on a second focal plane. The erected real image is viewed through an eyepiece as a virtual image in enlarged scale. In an embodiment of the invention, a concave mirror is used as the first focusing optical system. In a preferred embodiment of the invention, the first focusing optical system behind the taking lens is moved into and out of the optical axis of the taking lens in response to operations of the camera. Light intercepting members are moved in response to the movement of the first focusing optical system so that light intercepting member in the view finder may be closed and the light intercepting member in front of the film may be opened when the first focusing optical system is retracted from the optical axis of the taking lens and the shutter is released. When the shutter is charged, the first focusing optical system is brought into the optical axis of the taking lens and the light intercepting members in front of the film and in the view finder are opened and closed, respectively.

20 Claims, 15 Drawing Figures

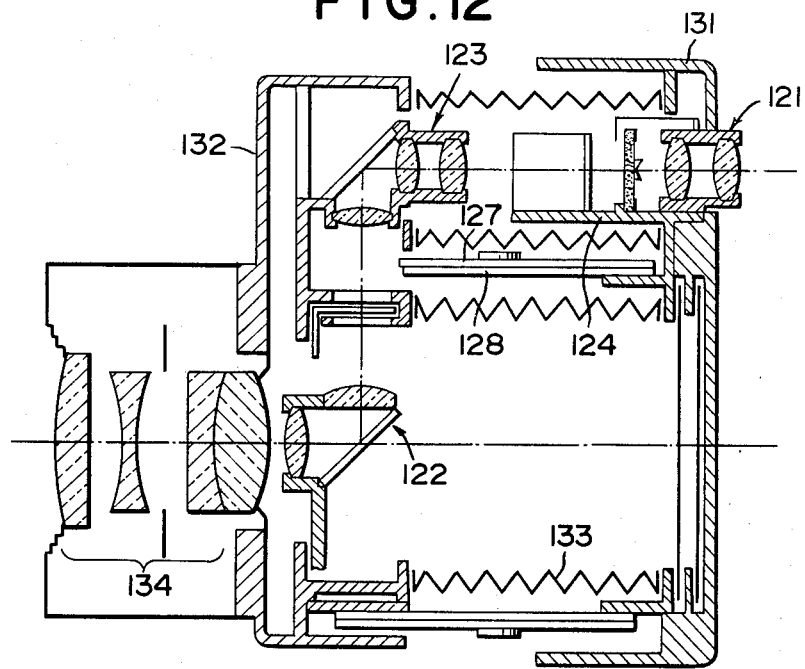
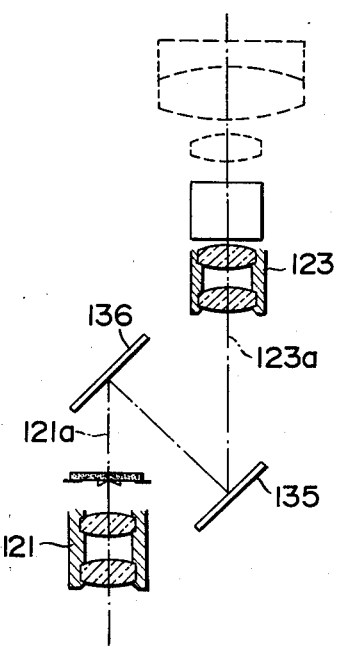

VIEW FINDER FOR A SINGLE LENS REFLEX CAMERA

BACKGROUND OF THE INVENTION

1. Field of the Invention

This invention relates to a view finder for a single lens reflex camera, and more particularly to a view finder for a single lens reflex camera which does not use a swing-up mirror and a pentagonal prism. This invention specifically relates to an optical system and mechanism which constitute the above described type of view finder. The view finder in accordance with the present invention employs a movable optical element in an embodiment thereof, and accordingly, the present invention is further concerned with a mechanism for moving an optical element in the optical system of the view finder.

2. Description of the Prior Art

The conventional view finder for a single lens reflex camera normally has a swing-up mirror of large size located between the taking lens and the film, a focusing glass located above the mirror to visualize an image focused by the taking lens of the same size as that of the image to be focused on the film thereby, and an image viewing optical system provided on the focusing glass including a pentagonal prism and an eyepiece for viewing the image formed on the focusing glass.

The above described view finder employed in the conventional single lens reflex camera is disadvantageous in that the view finder occupies a large space in the camera and increases the weight of the camera. These disadvantages preclude the manufacture of a single lens reflex camera of small size and weight. As is well known, the most prominent drawbacks of the single lens reflex camera are large size and great weight, and accordingly, it is desirable that the view finder for a single lens reflex camera be small in size and weight.

SUMMARY OF THE INVENTION

In the light of the foregoing observations and description of the conventional view finder for a single lens reflex camera, it is the primary object of the present invention to provide a view finder for a single lens reflex camera which is simple in construction and accordingly small in size and weight.

Another object of the present invention is to provide a view finder for a single lens reflex camera which does not use a swing-up mirror and a pentagonal prism and accordingly occupies little space in the camera.

Still another object of the present invention is to provide a view finder for a single lens reflex camera which can be combined with any type of range finder.

A further object of the present invention is to provide a view finder for a single lens reflex camera which can be applied either to an eye level type view finder or to a west level type view finder.

Other objects of the present invention will be made apparent from the following summary of the invention and the detailed description of the preferred embodiments thereof made hereinafter.

The view finder in accordance with the present invention comprises a first focusing optical system including a light reflecting means located in or behind the taking lens of the camera for reflecting the light passing through the taking lens and a focusing means for focusing with the light reflected by said image reflecting means an inverted real image in reduced scale, a second focusing optical system for erecting the inverted real image, and an eyepiece lens system through which the erected real image is viewed as a virtual image in enlarged scale.

The above light reflecting means is a mirror or a prism having a reflecting face inclined with respect to the optical axis of the taking lens system and located in or immediately behind the taking lens system. Since the mirror or prism is located in or immediately behind the taking lens system of the camera, the size thereof can be considerably small to form a real image in reduced scale. The "reduced scale" in which a real image of the object is formed by said first focusing optical system of the view finder of this invention referred to in this specification means a reduced scale of about 1:2 to 1:10. Since the image of the object is formed in the reduced scale, the second focusing optical system and the eyepiece lens system may be small in size.

The light reflecting means located in or behind the taking lens system may be a concave mirror which has a function to form a real image. In this case, the concave mirror serving as the light reflecting means also serves as the focusing means of the first focusing optical system.

In the second focusing optical system and the eyepiece lens system may be used mirrors or prisms in addition to lenses.

The light reflecting means such as a small mirror or a prism located on the optical axis of the taking lens system of the camera should preferably be retracted from the optical axis when taking a picture. Further, there must be a light intercepting means in the view finder system for preventing the ambient light from entering the camera through the view finder system when taking a picture. In addition, if the camera does not use a focal plane shutter, there must be a light intercepting means in front of the film so that the film may be prevented from being exposed to the light coming into the camera through the view finder system when the shutter is not released. It is desirable that the light intercepting means in the view fincer system be moved to close the optical path of the view finder system and the light intercepting means in front of the film be moved to open the light path in front of the film when the shutter is released.

In accordance with a preferred embodiment of the present invention, the above described light reflecting means such as a mirror and a prism is moved into and retracted from the optical path of the taking lens system and the light intercepting means are brought into and removed from the operating positions in response to operations of the camera so that these means may intercept the light when desired. In this embodiment, in response to the shutter release operation, the light intercepting member in the view finder is closed to prevent the ambient light from entering the camera and sensitizing the film, and the light intercepting member located in front of the film is removed to expose the film to the light coming through the taking lens. Further, in response to the shutter charge operation, the light intercepting member in the view finder is opened and the light intercepting member in front of the film is closed. Thus, the light intercepting members are automatically moved as desired by the normal operation of the camera.

3

BRIEF DESCRIPTION OF THE DRAWING

FIG. 12 is a longitudinal sectional view in elevation of a single lens reflex camera provided with another foldable view finder in accordance with still another embodiment of the invention, FIG. 13 is a schematic plan view showing the arrangement of a second focusing optical system and an eyepiece of the view finder employed in the camera as shown in FIG. 12.

PREFERRED EMBODIMENT OF THE INVENTION

Figure 1:
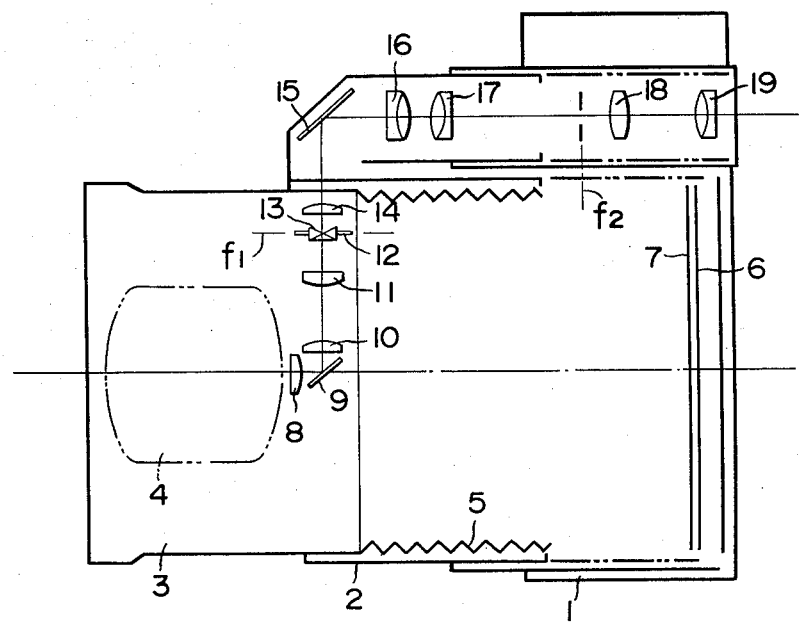
FIG. 1 is a longitudinal schematic cross sectional view in elevation of a single lens reflex camera provided with an embodiment of the view finder in accordance with the present invention.
Figure 2:
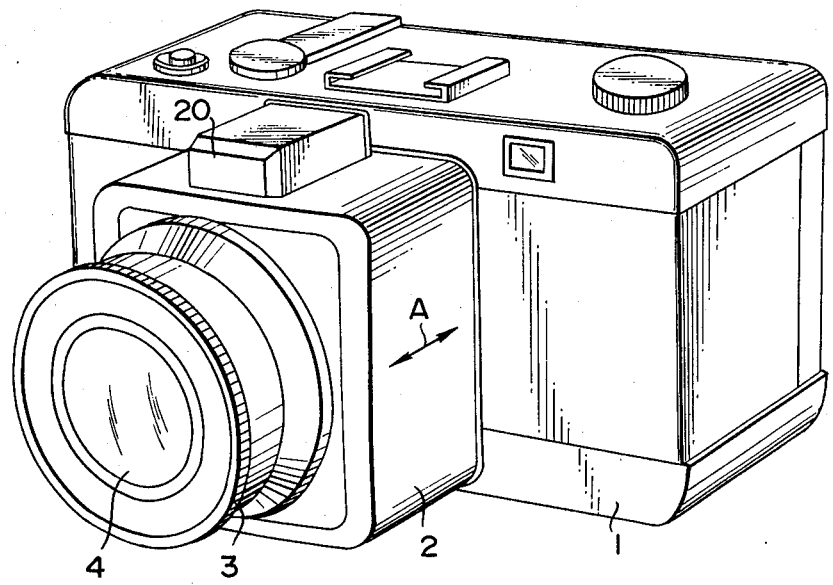
FIG. 2 is a perspective view showing the appearance of the single lens reflex camera as shown in FIG. 1.

A single lens reflex camera provided with an eye level type view finder in accordance with an embodiment of the present invention is illustrated in FIGS. 1 and 2. The single lens reflex camera shown in FIGS. 1 and 2 comprises a camera body 1, a slidable front housing 2 and a lens barrel 3 mounted to the front end of the front housing 2. The lens barrel 3 has a taking lens 4 and the slidable front housing 2 is slidable back and forth along the optical axis of the taking lens 4. As shown in FIG. 2, the front housing 2 is connected with the camera body 1 by means of bellows 5. In the camera body 1 is supported a film 6 on which an image is focused through the taking lens 4. In front of the film 6 is provided a focal plane shutter 7. Immediately behind the taking lens 4 on the optical axis thereof is located a convergent lens 8 of small diameter. Just behind the convergent lens 8 is provided a mirror 9 for receiving and reflecting the light coming through the taking lens 4. As shown in FIG. 2, the mirror 9 is inclined at 45° with respect to the optical axis of the taking lens 4 and reflects the light from the lens 4 vertically upward. Just above the mirror 9 is located a second convergent lens 10 and a third convergent lens 11 for focusing an inverted real image of an object to be photographed on a first focal plane $f1$. On the first focal plane $f1$ is located a field aperture 12 and an optical wedge 13 for a split image type range finder. On this first focal plane $f1$ is formed an inverted real image corresponding to the real image to be formed on the film 6. The inverted real image formed on the first focusing plane $f1$ is reduced in scale with respect to the image to be formed on the film 6. The ratio of reduction in scale of the image formed on the first focal plane $f1$ is about from 1:2 to 1:10. Further above the field aperture 12 is located a convergent lens 14, and above the convergent lens 14 is located a second mirror 15 for receiving light from the lens 14 and reflecting the light at right angle backward in parallel to the optical axis of the taking lens 4. One the optical axis of the light reflected by the mirror 15 are arranged lens components 16 and 17 for focusing an erected real image of said inverted real image on a second focal plane $f2$. Behind the second focal plane $f2$ is provided a viewing eyepiece lens system comprising a lens 18 and a lens component or an eyepiece 19 by which the erected real image on the second focal plane $f2$ is viewed as an erected virtual image in enlarged scale.

Said convergent lenses 8, 10 and 11 and a mirror 9 constitute a first focusing optical system to form an inverted image on the first focal plane $f1$. Said convergent lenses 14, 16 and 17 and a mirror 15 constitute a second focusing optical system for erecting the inverted image and focusing an erected image on the second focal plane $f2$. The first focusing optical system should preferably be retracted from the optical path of the taking lens 4 when taking a picture so as to obtain a sharp image of high quality on the film 6. However, the first focusing optical system may be fixed at the position behind the taking lens 4 as shown in FIG. 2 if a light intercepting member which prevents the light passing through or diffracted by the first focusing optical system from reaching the film 6 is provided behing the first focusing optical system, since the first focusing optical system is small in comparison with the taking lens 4. In such a case, the exposure of the film to the light coming through the taking lens 4 is reduced by the amount corresponding to the size of the light intercepting member located behind the first focusing optical system.

Further, it will be understood that said optical wedge 13 for the split image type range finder and/or the field aperture 12 may be located on the second focal plane $f2$. The field aperture 12 should preferably be located on the second focal plane $f2$. This is because the virtual image viewed through the eyepiece lens system does not move even if the viewing eye outside the eyepiece 19 moves, when the field aperture 12 is located on the second focal plane $f2$.

As shown in FIG. 2 which shows the appearance of a single lens reflex camera provided with the view finder in accordance with an embodiment of the present invention, the overall size of the camera is made compact by employing the view finder in accordance with this invention which does not use a pentagonal prism. The front housing 2 is slidable back and forth in the direction of the optical axis of the taking lens 4 as indicated by an arrow A in FIG. 2. The view finder in accordance with this invention is covered by a small covering portion 20 on the housing 2.

In the above described embodiment of the invention, the first focusing optical system is comprised of a plane mirror 9 and lenses 8, 10 and 11 to reflect the light coming through the taking lens 4 and focusing an inverted real image in reduced scale on the first focal plane $f1$. The following embodiment employs a first focusing optical system which is comprised only of a concave mirror which has a function both to reflect the light from the taking lens upward and to focus a real image thereby on the first focal plane.

Figure 3:
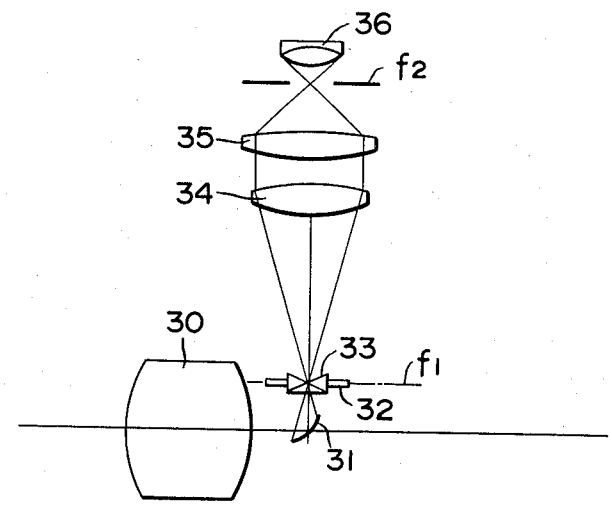
FIG. 3 is a schematic elevational view showing the optical system of another embodiment of the view finder in accordance with the present invention.

FIG. 3 shows a second embodiment of the present invention which is applied to a waist-level type view finder. The view finder in accordance with the second embodiment of this invention comprises a concave mirror 31 located immediately behind the taking lens 30 for reflecting and converging the light coming through the taking lens 30. The concave mirror 31 constitutes said first focusing optical system by itself which forms an inverted real image of the object to be photographed in reduced scale on the first focal plane $f1$. On the first focal plane $f1$ is provided a field aperture 32 and an optical wedge 33 for a split image type range finder. Above the field aperture 32 are provided convergent lenses 34 and 35 which constitute a second focusing optical system which erects said inverted real image on a second focal plane $f2$. Above the second focal plane $f2$ is provided an eyepiece 36 through which the erected real image formed on the second focal plane $f2$ is viewed as a virtual image in enlarged scale.

In this embodiment also, the field aperture 32 and/or the optical wedge 33 on the first focal plane $f1$ may be located on the second focal plane $f2$.

Figure 4:
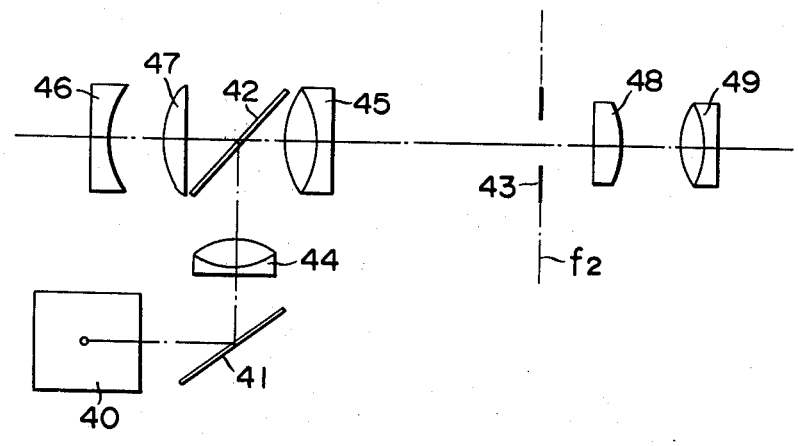
FIG. 4 is a schematic plan view showing the optical system of a range finder in which an embodiment of the view finder in accordance with the present invention is employed.

In both the above described embodiments of the present invention as shown in FIGS. 1 and 2, it will be noted that the angle of inclination and accordingly the direction of reflection of said plane mirror 9 and the concave mirror 31 are not limited to those shown in the drawings. For instance, the mirrors 9 and 31 may be oriented to reflect the light coming through the taking lens obliquely backward or sideward, not upward. Further, the view finder in accordance with the present invention can be applied to any type of range finder. One example of the range finder in which the view finder in accordance with the present invention is employed is shown in FIG. 4. Behind a mirror 40 which corresponds to said mirror 15 in the second focusing optical system employed in the first embodiment shown in FIG. 1, is located a mirror 41 to reflect the light from said mirror 40 at right angle sideward as shown in FIG. 4. In this case, no optical wedge 13 is employed. The light reflected by the mirror 41 is further reflected by a half-transparent mirror 42 at right angle backward and forms an erected real image through lenses 44 and 45 on the second focal plane $f2$ where a field aperture 43 is located. In front of the half-transparent mirror 42 on the optical axis of the light reflected thereby are located two lenses 46 and 47. The two lenses 46 and 47 form a real image of the object on the second focal plane $f2$ so that the image may be overlapped with the image formed by the second focusing optical system including said mirrors 40, 41 and 42 and lenses 44 and 45. As is well known in the art, the mirror 41 is rotatable about an axis perpendicular to the plane including the optical axis of the light reflected thereby, and the distance from the object is determined by the angle of the rotatable mirror 41.

As mentioned hereinbefore, said first focusing optical system including a reflecting member located on the optical axis of the taking lens should preferably be removed from the optical axis when the shutter is released to expose the film. Further, there should preferably be a light intercepting member in the view finder of the present invention for preventing the ambient light from entering the camera therethrough when taking a picture. In addition, if a lens shutter is used in the camera, there must be a light intercepting member in front of the film so that the film may be prevented from being exposed to the light coming through the view finder when the view finder is used. When a lens shutter is used, the light intercepting member in front of the film must be closed and the light intercepting member in the view finder is opened when the shutter blades are opened in response to wind up of film and charge of the shutter. When the shutter is released, the shutter blades of the lens shutter are first closed and then instantly opened and closed to expose the film to the imagewise light coming through the taking lens for a predetermined exposure time. At this moment, the light intercepting member in the view finder is instantly closed and light intercepting member in front of the film is opened.

FIGS. 5 to 8 show a single lens reflex camera provided with a view finder in accordance with a preferred embodiment of the present invention in which the above described operations of the light intercepting members are automatically conducted in accordance with the normal operations of the camera. In response to the shutter charge oepration of the camera, the light intercepting member in the view finder system is opened and the shutter blades are opened, after the light intercepting member in front of the film is closed. When the shutter is released, the light intercepting member in front of the film is opened after the shutter blades and the light intercepting member in the view finder are closed to be ready for the shutter release.

In order to simplify the above described operations of the mechanism for moving the light intercepting members in response to operations of the shutter mechanism, the following embodiment of the present invention as shown in FIGS. 5 to 8 employs a single operating member which is rotated clockwise and counterclockwise for moving the light intercepting members in response to operations of the camera. By the clockwise rotation of this operating member, the light intercepting member in front of the film is closed, a mirror for reflecting the light from the taking lens upward is moved into the optical axis of the taking lens, the light intercepting member in the view finder is opened and the shutter blades are opened. By the counterclockwise rotation of this member, the shutter blades are closed, the light intercepting member in the view finder is closed the mirror behind the taking lens is retracted from the optical axis and the light intercepting member in front of the film is opened.

Figure 5:
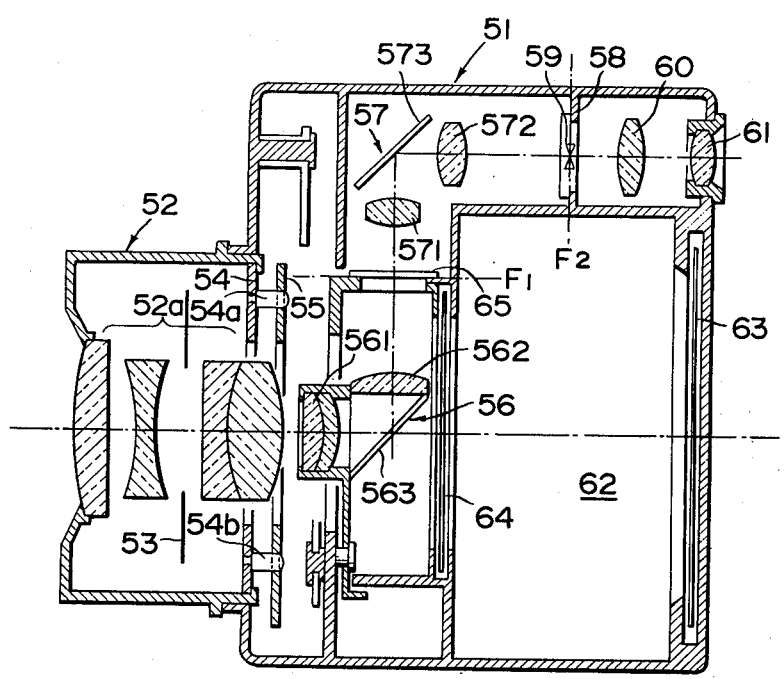
FIG. 5 is a longitudinal cross sectional view in elevation of a single lens reflex camera provided with another embodiment of the view finder in accordance with the present invention in which a mechanism for moving a part of the view finder is employed.

Now referring to FIG. 5 which shows a single lens reflex camera provided with the view finder in accordance with a preferred embodiment of the present invention, a camera body 51 is provided on the front face thereof a demountable taking lens barrel 2 which has a taking lens system 52a. In the taking lens system 52a is provided a lens shutter 53. A shutter setting ring 54 for charging the shutter 53 is rotatably provided at the rear end of the taking lens barrel 52. Behind the shutter setting ring 54 in the camera body 51 is provided an operating member 55 which is associated with an interlocking mechanism in the camera as described in detail hereinafter. The operating member 55 is engaged with the shutter setting ring 54 by means of two engaging pins 54a and 54b fixed to the setting ring 54 so that the shutter setting ring 54 may be rotated together with the operating member 55.

Behind the taking lens system 52a is located a first focusing optical system 56 which comprises a set of convergent lenses 561 and 562 and a plane mirror 563. The first lens 561 is located immediately behind the taking lens system 52a in parallel therewith, the mirror 563 is inclined at 45° with respect to the optical axis of the taking lens system 52a and the first lens 561, and the second lens 562 is located above the mirror 563 at right angle with respect to the optical axis of the light reflected by the mirror 563. The first and second lenses 561 and 562 are fixed to the mirror 563 and moved together therewith. The first focusing optical system 56 is movable between two positions in one of which the mirror 563 is on the optical axis of the taking lens system 52a as shown in FIG. 5 and in the other of which the mirror 563 is out of the optical path of the light coming through the taking lens system 52a. The first focusing optical system 56 reflects by the mirror 563 the light coming through the taking lens system 52a and the first lens 561 upward through the second lens 562, and forms an inverted real image in reduced scale on a first focal plane F1 above the second lens 562. Above the first focal plane F1 is provided a second focusing optical system 57 which comprises a first lens 571 located on the optical axis of the light reflected by the mirror 563 of the first focusing optical system 56 at right angle with respect thereto, a mirror 573 located above the first lens 571 inclined at 45° with respect to the optical axis for reflecting the light from the first lens 571 backward as shown in FIG. 5, and a second lens 572 provided behind the mirror 573 at right angle with respect to the optical axis of the light reflected thereby to form an erected real image on a second focal plane F2. On the second focal plane F2 is provided a field aperture 58 and an optical wedge 59 for a split image type range finder. Behind the second focal plane F2 is provided an eyepiece lens system comprising a lens 60 and an eyepiece 61. By the eyepiece lens system the real image erected on the second focal plane F2 is viewed as a virtual image in enlarged scale. The eyepiece lens system is provided in the rear portion of the top of the camera body 51.

Under the eyepiece lens system is located a dark box 62 of the camera. At the rear end of the dark box 62 is supported a photographic film 63. At the front end of the dark box 62 is provided a movable light intercepting curtain 64. Although the light intercepting curtain 64 may be located just in front of the film 63, it should preferably be located immediately behind the first focusing optical system 56 apart from the film 63 because the farther from the film 63 is located the curtain 64, the smaller can be made the size thereof. The light intercepting curtain 64 is movable to close and open the optical path of the light coming through the taking lens system 52a between the film 63 and the first focusing optical system 56. In the vicinity of the first focal plane F1 is provided a movable light intercepting plate 65. The light intercepting plate 65 is movable to close and open the optical path of the light passing through the view finder at a position in the vicinity of the first focal plane F1. The two light intercepting means 64 and 65 are moved in response to operations of the camera as mentioned hereinbefore.

Figure 6:
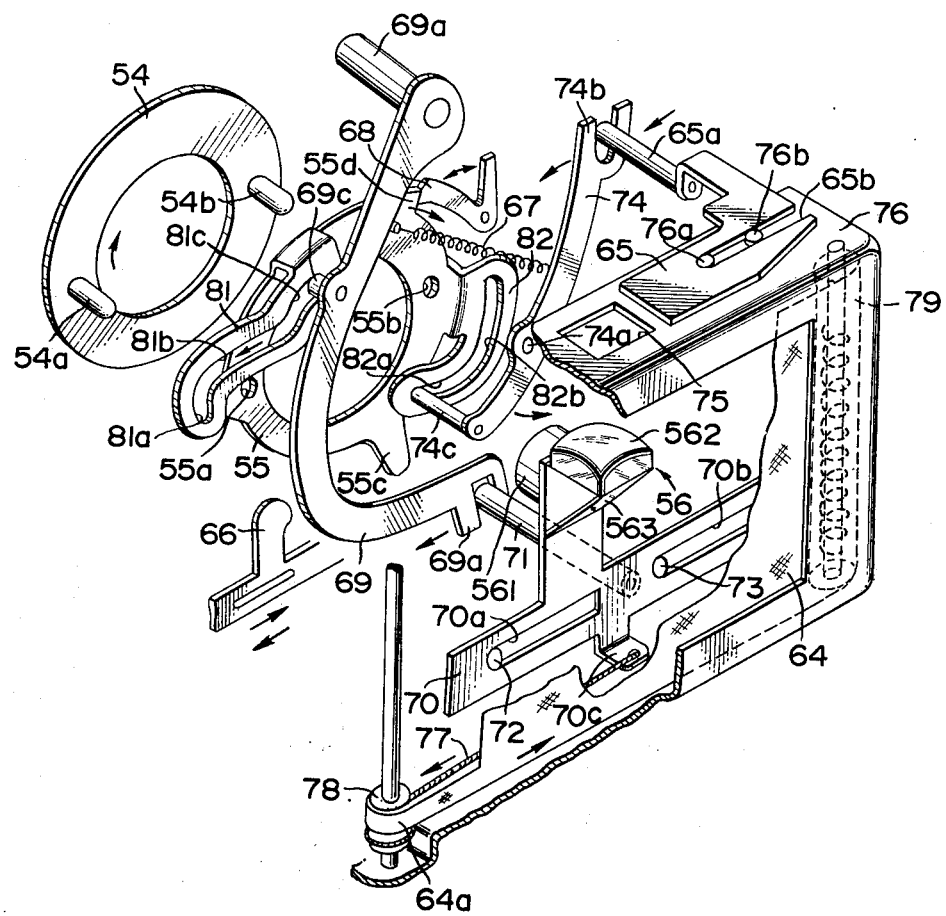
FIG. 6 is a partly broken perspective view showing the mechanism for moving a part of the view finder of the invention employed in the camera as shown in FIG. 5.

A mechanism for moving said light intercepting curtain 64 and plate 65 is illustrated in FIG. 6. Referring to FIG. 6, the shutter setting ring 54 and the operating member 55 are provided with a large central aperture for passing therethrough the light coming from the taking lens system 52a. As mentioned hereinbefore, the shutter setting ring 54 and the operating member 55 are engaged with each other by means of a pair of pins 54a and 54b fixed to the shutter setting ring 54 and a pair of holes 55a and 55b with which the pins 54a and 54b are engaged. Therefore, the operating member 55 and the shutter setting ring 54 are rotated together in the same direction. The shutter setting ring 54 charges the shutter when rotated counterclockwise in FIG. 6 and releases the same when rotated clockwise. When charging the shutter, the shutter setting ring 54 opens the shutter blades (not shown) and allows the light pass through the shutter blades at the end of the counterclockwise rotation thereof so that the image of the object may be observed through the view finder. When releasing the shutter, the shutter setting ring 54 once closes the shutter blades at the initial stage of the clockwise rotation thereof, and then instantly opens and closes the shutter blades at the end of the rotation to expose the film during a predetermined exposure time.

The operating member 55 has at the lower edge thereof a radially extending portion 55c which is pushed to the right (in FIG. 6) by a shutter setting lever 66 when the film is wound up and the shutter is charged. By the rightward movement of the shutter setting lever 66, the radially extending portion 55c is pushed to the right and the operating member 55 is rotated counterclockwise. The operating member 55 is urged in the clockwise direction by means of a tension spring 67 tensioned between the operating member 55 and a part of the camera body. The operating member 55 further has a radially extending step portion 55d which is to be engaged with a stopper lever 68. The stopper lever 68 is urged counterclockwise to be engaged with the step portion 55d, and disengaged therefrom by a shutter release member (not shown) when the shutter is released. Therefore, once the operating member 55 is rotated counterclockwise and the step portion 55d is brought into engagement with the stopper lever 68, the clockwise rotation of the operating member 55 is blocked until the shutter is released. When the shutter is released, by depression of a shutter release button (not shown), the stopper lever 68 is rotated clockwise and is disengaged from the step portion 55d of the operating member 55, and the operating member 55 is rotated clockwise by the tension of the tension spring 67. In the course of the clockwise rotation of the operating member 55, the shutter blades are first closed and then instantly opened and closed to expose the film for a predetermined exposure time.

The operating member 55 is further provided with two constraining cams 81 and 82. One cam 81 is composed of a first cam portion 81a which is in the form of arc having the center of curvature at the center of rotation of the operating member 55, a second cam portion 81b continued from the first cam portion 81a and extending obliquely outward, and a third cam portion 81c continued from the second cam portion 81b and being in the form of arc having the center of curvature at the same point as that of the first cam portion 81a and having a larger diameter than that of the same. With this cam 81 is engaged a cam follower pin 69c of a mirror operating lever 69 which is pivotally mounted at the upper end thereof to a pivot 69a located above the operating member 55 and has a fork 69b at the lower end thereof. By the rotation of the operating member 55, the mirror operating lever 69 is swung back and forth. In more detail, in the first stage of the clockwise rotation of the operating member 55, the mirror operating lever 69 does not move while the cam follower pin 69c follows the first cam portion 81a. Then, when the cam follower pin 69c follows the second cam portion 81b, the mirror operating lever 69 is swung clockwise. Finally, while the cam follower pin 69c follows the third cam portion 81c, the mirror operating lever 69 does not move. The fork 69b of the mirror operating lever 69 is engaged with a mirror operating pin 71 fixed to a mirror operating plate 70 which supports said first focusing optical system 56 including said mirror 563. Therefore, the swing of the mirror operating lever 69 is transmitted to the first focusing optical system 56. The mirror operating plate 70 is provided with two elongated holes 70a and 70b which are in slidable engagement with two guide pins 72 and 73 fixed to the camera so that the mirror operating plate 70 may be slid back and forth by the swing of the mirror operating lever 69. The mirror operating plate 70 is movable between two positions in one of which, as shown in FIG. 6, the first focusing optical system 56 is in the optical path of the taking lens and the light coming through the taking lens is reflected upward by the mirror 563. As the mirror operating lever 69 is swung clockwise from the position as shown in FIG. 6, the mirror operating plate 70 is moved leftward to the other position and the first focusing optical system 56 is moved out of the optical path of the light coming through the taking lens.

The other constraining cam 82 of the operating member 55 is composed of a first cam portion 82a extending obliquely outward and a second cam portion 82b continued from the first cam portion 82a and being in the form of arc having the center of curvature at the center of rotation of the operating member 55. With this cam 82 is engaged a cam follower pin 74c fixed to the lower end of a light intercepting plate operating lever 74 which is pivotally mounted at an intermediate part thereof to a pivot 74a and has a fork 74b at the upper end thereof. The rotation of the operating member 55 is, therefore, transmitted to the light intercepting plate operating lever 74. In detail, in the first stage of the clockwise rotation of the operating member 55 while the cam follower pin 74c follows the first cam portion 82a of the constraining cam 82, the light intercepting plate operating lever 74 is swung counterclockwise. Then, when the operating member 55 is further rotated clockwise and the cam follower pin 74c of the lever 74 follows the second cam portion 82b, the light intercepting plate operating lever 74 does not move.

The fork 74b of the light intercepting plate operating lever 74 is engaged with a pin 65a fixed to a light intercepting plate 65 which is movable to close and open an aperture 75 provided in the vicinity of said first focal plane F1 on the optical path of the light reflected by said mirror 563. The light intercepting plate 65 is provided with a guide slot 65b which is in slidable engagement with two guide pins 76a and 76b fixed to a part of a plate 76 provided with said aperture 75 in the camera. Therefore, by the swing of said lever 74, the light intercepting plate 65 is slid back and forth on the plate 76 to close and open said aperture 75. When the lever 74 is swung clockwise, the light intercepting plate 65 is moved to the right (in FIG. 6) to open the aperture 75. When the lever 74 is swung counterclockwise, the light intercepting plate 65 is moved to the left to close the aperture 75. Since the aperture 75 is provided in the optical path of the light reflected by said mirror 563 of the first focusing optical system 56, namely in the optical path of the view finder system, the ambient light is prevented from entering the camera by the light intercepting plate 65 when it closes the aperture 75.

In the above described construction including the shutter setting ring 54 and the operating member 55, the constraining cams 81 and 82 are so designed that the lens shutter may be closed in the first stage of the clockwise rotation of the operating member 55 in which the cam follower pins 69c and 74c of the levers 69 and 74 follow the first cam portions 81c and 82c.

In the above described preferred embodiment of the present invention, a light intercepting curtain 64 provided in front of the film 63 is interlocked with said first focusing optical system 56 so that the light intercepting curtain 64 may be closed and opened in response to the movement of the first focusing optical system 56, and accordingly, in response to the open and closure of the light intercepting plate 65, respectively. Said mirror operating plate 70 is provided at the lower end thereof with a bent portion 70c, and an end of a string 77 is fixed to the bent portion 70c. The other end of the string 77 is wound on a pulley 78 on which a part 64a of one end of the light intercepting curtain 64 is wound in the opposite direction. The light intercepting curtain 64 is wound on a spring drum 79 at the other end thereof so as to be urged to the left by the tension thereof. Therefore, the light intercepting curtain 64 is moved by the movement of the mirror operating plate 70. In more detail, when the operating member 55 is rotated in the clockwise direction at the time of shutter release, the mirror operating lever 69 is swung clockwise to move the mirror operating plate 70 to the left and move the first focusing optical system 56 out of the optical path of the light coming through the taking lens. Accompanying the leftward movement of the mirror operating plate 70, the light intercepting curtain 64 is pulled to the right by the spring drum 79 to expose the film 63.

Figure 7:
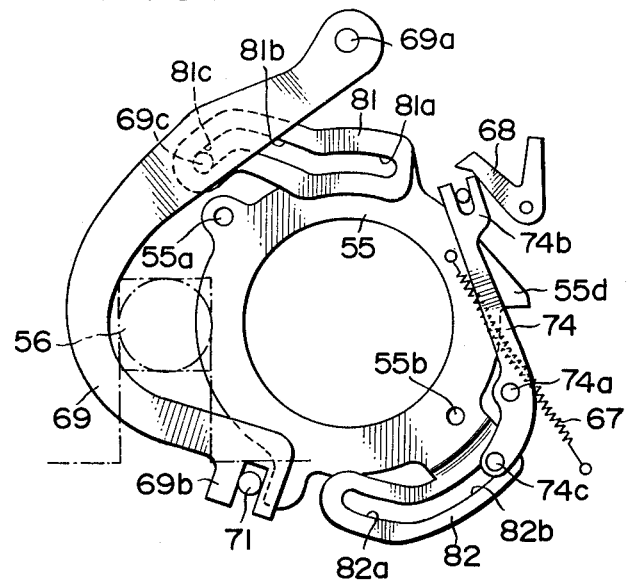
FIG. 7 is a fragmentary front view showing a state of an operating member employed in the above mechanism for moving light intercepting members provided in the camera.
Figure 8:
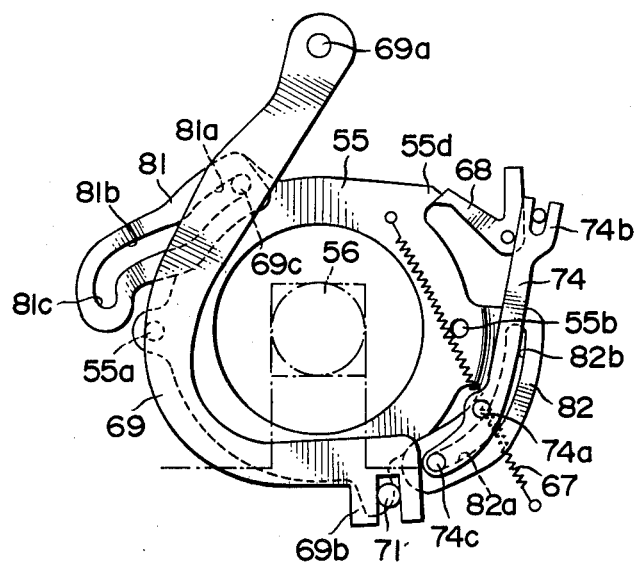
FIG. 8 is a fragmentary front view showing another state of said operating member shown in FIG. 7.

The operation of the above described preferred embodiment of the invention will now be described hereinbelow with reference to FIGS. 5 to 8. First, before the shutter is set, as shown in FIG. 7, the cam follower pin 69c of the mirror operating lever 69 and the cam follower pin 74c of the light intercepting plate operating lever 74 are at the outer end of the cams 81 and 82, respectively. Accordingly, the first focusing optical system 56 is out of the optical axis of the taking lens and the light intercepting curtain 64 is opened and the light intercepting plate 65 is closed. When the film is wound up and the shutter is charged, the shutter setting lever 66 is moved to the right to push the radially extending portion 55c of the operating ring 55 to the right and rotate the operating ring in the counterclockwise direction until the step portion 55d of the operating ring 55 is brought into engagement with the stopper lever 68. After the step portion 55d of the operating member 55 is engaged with the stopper lever 68, the shutter setting lever 66 is returned to its original position by a spring force. When the operating member 55 is rotated counterclockwise as described above, the mirror operating lever 69 swings counterclockwise and the fork 69b thereof moves to the right. Therefore, the first focusing optical system 56 is moved to the right into the optical axis of the taking lens to reflect the light from the taking lens upward, and the light intercepting curtain 64 is moved to the left to close the optical path between the first focusing optical system 56 and the film 63. Further, the light intercepting plate operating lever 74 is rotated clockwise in response to the counterclockwise rotation of the operating member 55 and the fork 74b thereof moves to the right to move the light intercepting plate 65 to the light to open the aperture 75 in the view finder system. Thus, automatically upon the charge of the shutter, the film 63 is prevented from being exposed to the light coming through the taking lens and the optical path of the view finder system is opened as shown in FIGS. 6 and 8.

Then, upon depression of the shutter release button (not shown), the stopper lever 68 is disengaged from the step portion 55d of the operating member 55 and the operating member 55 starts to rotate in the clockwise direction by the force of the tension spring 67. At the first stage of the clockwise rotation of the operating member 55, the shutter blades (not shown) are closed by the clockwise rotation of the shutter setting ring 54 and the light intercepting plate 65 in the view finder is closed by the lever 74 which is swung counterclockwise by the first cam portion 82b of the constraining cam 82. Then, upon further rotation of the operating member 55, the mirror operating lever 69 is swung clockwise by the second cam portion 81b of the other constraining cam 81. By the clockwise swing of the mirror operating lever 69, the first focusing optical system 56 is moved to the left out of the optical path of the light from the taking lens, and the light intercepting curtain 64 is moved to the right to open the optical path in front of the film 63. Thus, the preparation for exposure of the film is completed. Upon further clockwise rotation of the operating member 55, the shutter setting ring 54 is rotated clockwise to instantly open the close the shutter blades to expose the film for the predetermined exposure time. The third cam portion 81c of the cam 81 is for allowing this clockwise rotation of the shutter setting ring 54 for exposure of the film after the light intercepting plate 65 and the curtain 64 have been moved.

In the above described mechanims, the first focusing optical system of the view finder in accordance with the present invention is moved into and out of the optical path of the light coming through the taking lens automatically in response to the shutter charge and release operations of the camera. The above mechanism is advantageous in that the construction thereof if simple in spite of comlicated operations performed thereby for moving the light intercepting means.

The single lens reflex camera provided with the view finder in accordance with the present invention is advantageous in that the camera body can be made foldable or contractible. One embodiment of the view finder of this invention which can be folded to make the camera contractible is shown in FIGS. 9 to 11.

Figure 10:
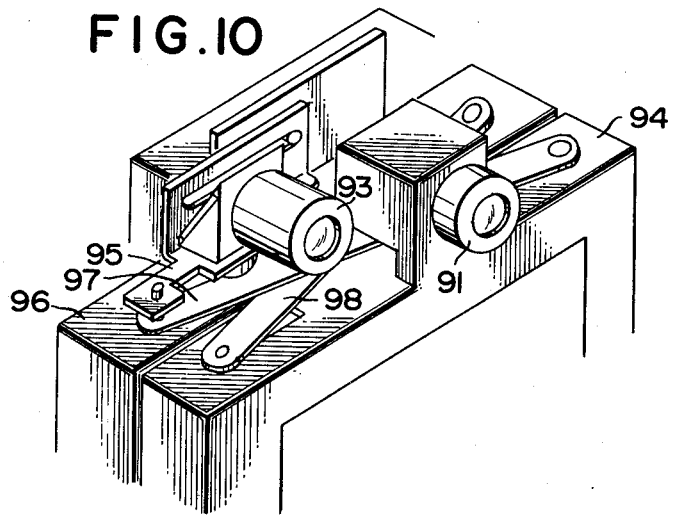
FIG. 10 is a partial perspective view showing the folded state of the optical system supporting mechanism as shown in FIG. 9.
Figure 11:
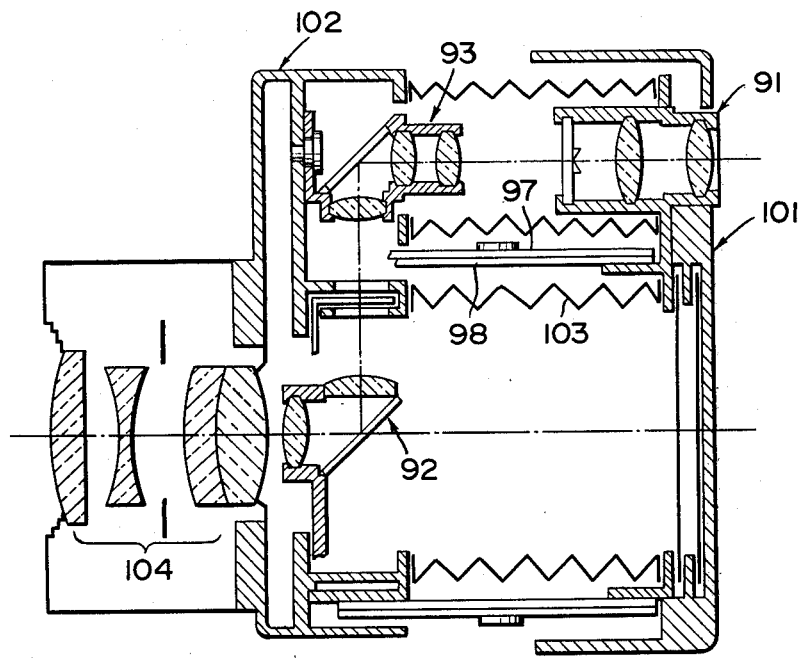
FIG. 11 is a longitudinal sectional view in elevation of a single lens reflex camera provided with the foldable view finder as shown in FIGS. 9 and 10.

Referring to FIG. 11, an eyepiece 91 of the view finder of this embodiment is fixed to the camera body 101, and the first focusing optical system 92 and the second focusing optical system 93 are fixed to the front housing 102 of the camera. The front housing 102 is connected with the camera body 101 by means of bellows 103 and is movable back and forth along the optical axis of the taking lens system 104. In order to make the overall size of the camera small when it is not used, the second focusing optical system 93 is movable in the direction perpendicular to the optical axis of the taking lens 104 when the front housing 102 is moved to the camera body 101 as shown in FIGS. 9 and 10. Referring to FIG. 9, the second focusing optical system 93 and the eyepiece 91 are arranged in a line to have a common optical axis as shown in FIG. 9 when the camera is used with the bellows 103 expanded. When the bellows 103 is folded and the second focusing optical system 93 is moved to the eyepiece 91, the eyepiece 91 and the second focusing optical system 93 are arranged side by side as shown in FIG. 10. The eyepiece 91 is fixed to a frame 94 in the camera body 101 and the second focusing optical system 93 is fixed to a slidable member 95 which is slidable along an elongated guide slot 96a extending laterally on a front support 96 provided in the front housing 102 of the camera. The slidable member 95 to which the second focusing optical system is fixed is mounted to an end 97a of an arm 97 which is pivotally mounted at the other end thereof to the frame 94. The frame 94 is also provided with a laterally extending guide slot 94a in which a pin 98a fixed to an end of another arm 98 is slidably engaged. The other end 98b of the arm 98 is pivotally mounted to the front support 96. Said two arms 97 and 98 are crossed and pivotally mounted at the middle portion thereof to each other as shown in FIG. 9 so that the front support 96 may be moved back and forth along the optical axis of the eyepiece 91. The second focusing optical system 93 is moved to the position by the eyepiece 91 as shown in FIG. 10 when the bellows 103 is folded and the front support 96 is moved close to the frame 94.

Figure 9:
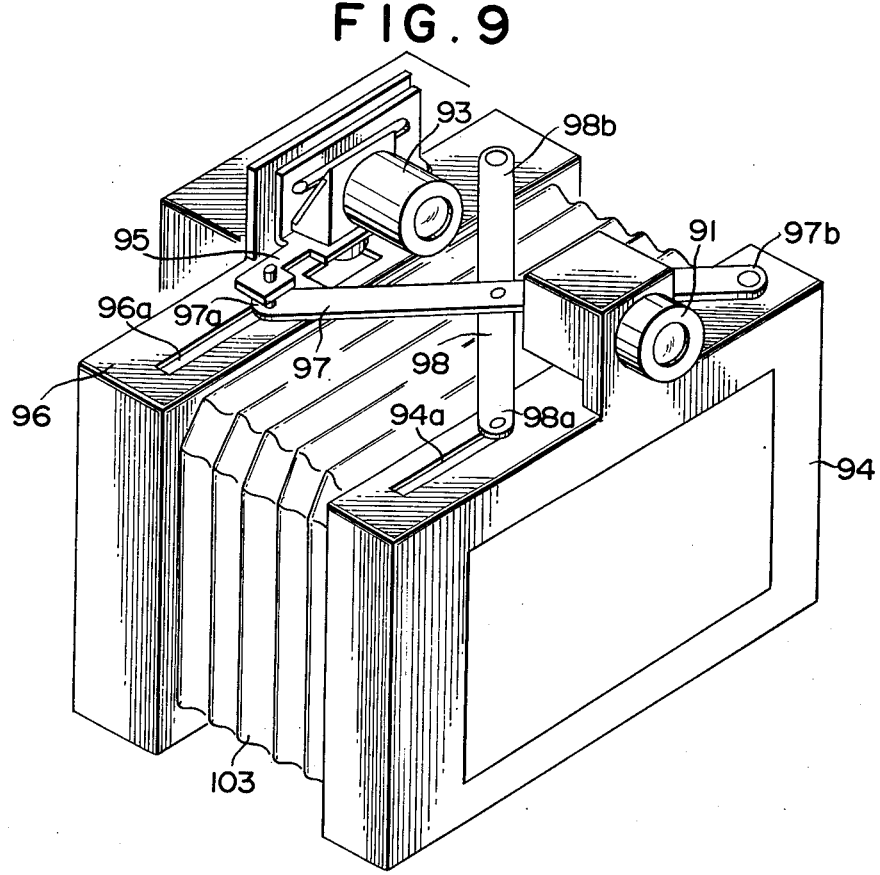
FIG. 9 is a perspective view showing the expanded state of a mechanism which supports an eyepiece and a second focusing optical system of a foldable view finder in accordance with still another embodiment of the invention which is suitable for a foldable camera.

When the view finder as described hereinabove and shown in FIGS. 9 to 11 is employed, the single lens reflex camera can be made foldable and considerably compact in size when folded.

Figure 14:
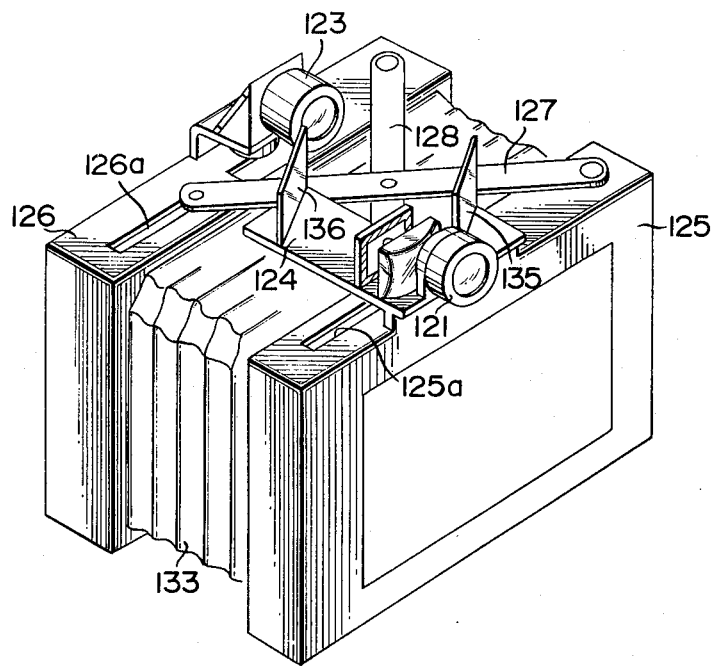
FIG. 14 is a perspective view showing the expanded state of a mechanism which supports the eyepiece and the second focusing optical system of the view finder as shown in FIG. 12.
Figure 15:
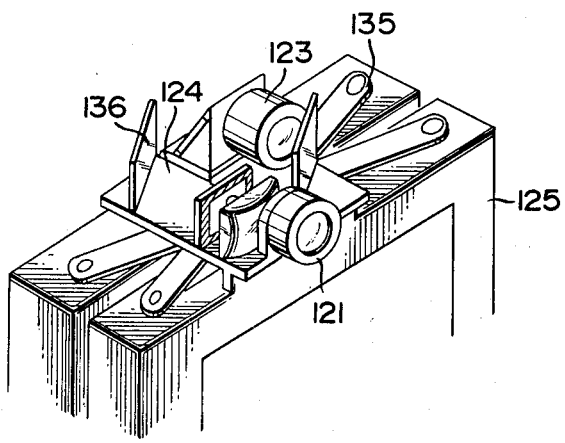
FIG. 15 is a partial perspective view showing the folded state of the optical system supporting mechanism as shown in FIG. 14.

Another embodiment of the view finder in accordance with the present invention in which a part thereof is foldable will now be described with reference to FIGS. 12 to 15. Referring to FIG. 12, the eyepiece 121 of the view finder system of this embodiment is fixed to the camera body 131, and the first focusing optical system 122 and the second focusing optical system 123 are fixed to the front housing 132. The front housing 132 and the camera body 131 are connected with each other by means of bellows 133 so that the front housing 132 may be moved back and forth along the optical axis of the taking lens system 134. In greater detail, as shown in FIGS. 14 and 15, the eyepiece 121 is mounted to a stage plate 124 fixed to a frame 125 which is fixed to a part of the camera body 131, and the second focusing optical system 123 is fixed to a front support 126 connected with the frame 125 by means of said bellows 133 and a linkage consisting of two crossed arms 127 and 128. An end of said arm 128 is guided by a laterally extending guide slot 125a provided on the frame 125 and the other end of the arm 128 is pivotally mounted to the front support 126. The other arm 127 is pivotally mounted to the frame 125 at an end thereof. The other end of the latter arm 127 is guided along a laterally extending guide slot 126 on the front support 126. By the linkage consisting of the above described two arms 127 and 128, the front support 126 is made movable back and forth along the optical axis of the eyepiece 121.

The view finder as shown in FIGS. 12 to 15 is characterized in that the optical axis 121a of the eyepiece 121 is separated from and in parallel to the optical axis 123a of the second focusing optical system 123 as shown in FIG. 13. On the optical axis 123a of the second focusing optical system 123 is provided a first mirror 135, and on the optical axis 121a of the eyepiece 121 is provided a second mirror 136 so that the light from the second focusing optical system 123 may pass through the eyepiece 121 after being reflected by the mirrors 135 and 136. As shown in FIG. 14, the mirrors 135 and 136 are fixed to said stage plate 124 mounted to the frame 125.

When the bellows 133 is folded and the front support 126 is moved backward close to the frame 125 in the camera body, the second focusing optical system 123 comes to a position by the second mirror 136 as shown in FIG. 15. Therefore, the optical system of the view finder can be compactly folded. This embodiment is further advantageous in that the overall size of the view finder is compact even when it is used, since two reflecting means are provided therein and optical axis thereof is bent twice.

We claim:

1. A view finder for a photographic single lens reflex camera having a taking lens with an optical axis to focus an image on a plane of the film therein comprising in combination;
    a first focusing means located behind the taking lens of the camera for reflecting the light coming through the taking lens at an angle with respect to the optical axis and focusing an inverted real image of an object to be photographed on a first focal plane in reduced scale by converging the light from the taking lens, the ratio of reduction of the size of the image focused on said first focal plane with respect to the size of the image focused on the plane of the film being between one half and one tenth,
    a second focusing means located on the optical axis of the light reflected by said first focusing means behind said first focal plane for focusing on a second focal plane an erected real image of said inverted real image on said first focal plane, and
    an eyepiece means located behind the second focal plane for viewing an erected virtual image of the object in enlarged scale therethrough.

2. A view finder for a single lens reflex camera as defined in claim 1 wherein said first focusing means comprises a reflecting means having a plane reflecting face located on the optical axis of the taking lens and being inclined at an angle with respect thereto, and convergent lens means located on the optical axis of the light reflected by the reflecting means.

3. A view finder for a single lens reflex camera as defined in claim 2 wherein said reflecting means is a prism having a total reflection face.

4. A view finder for a single lens reflex camera as defined in claim 2 wherein said reflecting means is a plane mirror.

5. A view finder for a single lens reflex camera as defined in claim 1 wherein said first focusing means is a concave mirror located on the optical axis of the taking lens being inclined thereto.

6. A view finder for a single lens reflex camera as defined in claim 1 wherein said second focusing means comprises convergent lens means to form on the second focal plane an erected real image of the inverted real image formed on the first focal plane.

7. A view finder for a single lens reflex camera as defined in claim 6 wherein said second focusing means further comprises a reflecting means located on the optical axis of the light reflected by said first focusing means, and said convergent lens means is located on the optical axis of the light reflected by said reflecting means.

8. A view finder for a single lens reflex camera as defined in claim 1 wherein said first focusing means is retractable from the optical axis of the taking lens.

9. A view finder for a single lens reflex camera as defined in claim 8 further comprising a shutter operating member which is moved in a first direction when a shutter is charged and moved in the opposite second direction when a shutter is released wherein said first focusing means is interlocked with the shutter operating means so that the former is moved into the optical axis of the taking lens in response to the movement of the latter in said first direction and is retracted from the optical axis of the taking lens in response to the movement of the latter in said second direction.

10. A view finder for a single lens reflex camera as defined in claim 1 wherein said eyepiece means is mounted to the camera body and said second focusing means is mounted to a front housing of the camera which is connected with the camera body by means of bellows and movable back and forth along the optical axis of the taking lens of the camera.

11. A view finder for a single lens reflex camera as defined in claim 10 wherein a first mirror is provided on the optical axis of the second focusing means to reflect the light coming through the second focusing means at an angle with respect thereto, a second mirror is provided at the intersection of the optical axis of the light reflected by the first mirror and the optical axis of the eyepiece means for reflecting the light coming from the first mirror reflected thereby toward the eyepiece means.

12. A view finder for a single lens reflex camera as defined in claim 10 wherein either the eyepiece or the second focusing means is movable laterally in the camera when the front housing is moved back and forth so that the eyepiece and the second focusing means are arranged side by side when the front housing of the camera is moved close to the camera body.

13. A view finder for a single lens reflex camera as defined in claim 12 wherein the front housing and the camera body are connected with each other by means of bellows and crossed links, and end of said links being pivotally mounted to the front housing and the camera body, respectively, the other end thereof being slidably engaged with laterally extending slots provided on the front housing and the camera body, respectively, and said eyepiece or second focusing means movable laterally is fixed to a member which is pivotally mounted to said end of the link which end is slidably engaged with the slot.

14. A single lens reflex camera, comprising in combination:
   a view finder mounted in said camera;
   a lens shutter mounted in said camera, shutter charging means and shutter release means respectively operatively connected to said shutter,
   a first focusing means located in a first position behind the taking lens of the camera for reflecting the light coming through the taking lens at an angle with respect to the optical axis and focusing an inverted real image of an object to be photographed on a first focal plane in reduced scale, said first focusing means being movable from said first position to a second position where the first focusing means is unable to reflect the light coming through the taking lens,
   a second focusing means located behind the first focal plane on the optical axis of the light reflected by said first focusing means for focusing an erected real image of said inverted real image on a second focal plane,
   an eyepiece means located behind the second focal plane,
   a first light intercepting means provided in the optical path of the light passing through the eyepiece,
   a second light intercepting means provided in front of a film loaded in the camera to cover the same,
   a first operating means associated with said first light intercepting means for moving the same into the light intercepting position when the shutter release means is operated and out of said position when the shutter charging means is operated,
   a second operating means associated with said second light intercepting means for moving the same into the position in front of the film when the shutter charging means is operated and out of said position when the shutter release means is operated, and
   a third operating means associated with said first focusing means and said first and second operating means for moving the first focusing means between said first and second positions in response to the operation of the first and second operating means so that the first focusing means is moved to said first position when the shutter charging means is operated and moved to said second position when the shutter release means is operated.

15. A single lens reflex camera as defined in claim 14 wherein said third operating means is an operating member which is rotated in one direction when the shutter is charged and rotated in the opposite direction when the shutter is released, and said first and second operating means are levers associated with said operating member and moved in the opposite directions by the rotation of the member in the opposite directions.

16. A single lens reflex camera as defined in claim 15 wherein said operating member is provided with two cams and said first and second operating means are provided with a cam follower engaged with the cams.

17. A single lens reflex camera as defined in claim 15 wherein said operating member is engaged with a shutter setting ring of the lens shutter so as to be rotated together therewith.

18. A single lens reflex camera as defined in claim 14 wherein said first light intercepting means is a slidable plate which is moved into and out of an aperture provided on the optical axis of the light reflected by the first focusing means.

19. A single lens reflex camera as defined in claim 18 wherein said first light intercepting means is provided in the vicinity of said first focal plane.

20. A single lens reflex camera as defined in claim 14 wherein said second light intercepting means is a slidable curtain which is moved into and out of the position in front of the film in the camera.

* * * * *